United States Patent
Kühn et al.

(10) Patent No.: US 6,359,924 B1
(45) Date of Patent: Mar. 19, 2002

(54) WIRELESS TELECOMMUNICATIONS SYSTEM, BASE STATION AND MOBILE USER TERMINAL THAT EXCHANGE RADIO SIGNALS ACCORDING TO A FREQUENCY HOPPING SEQUENCES

(75) Inventors: Edgar Kühn, Stuttgart; Ulrich Barth, Münchingen; Christoph Sperber, Pforzheim, all of (DE); Philippe Desblancs, Paris; Xavier Dugast, Chatou, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/292,957

(22) Filed: Apr. 16, 1999

(30) Foreign Application Priority Data

Apr. 17, 1998 (EP) .............................. 98440076

(51) Int. Cl.7 .................. H04B 15/00; H04K 1/00; H04L 27/30
(52) U.S. Cl. .................. 375/132; 375/219; 375/220; 375/133
(58) Field of Search ................. 375/132, 130, 375/133, 135, 219, 220, 339, 362, 377; 370/522

(56) References Cited

U.S. PATENT DOCUMENTS

| | | | |
|---|---|---|---|
| 4,554,668 A | 11/1985 | Deman et al. | 375/132 |
| 4,558,453 A | 12/1985 | Mimken | 375/132 |
| 5,377,221 A | 12/1994 | Munday et al. | 375/132 |
| 5,381,443 A | 1/1995 | Borth et al. | 375/132 |
| 5,926,471 A * | 7/1999 | Shoji | 370/342 |
| 6,295,310 B1 * | 9/2001 | Yamauchi et al. | 375/133 |

FOREIGN PATENT DOCUMENTS

| | | | |
|---|---|---|---|
| EP | 0 650 304 A2 | 4/1995 | H04Q/7/20 |
| EP | 0 467 600 B1 | 8/1995 | H04Q/7/20 |
| EP | 0 423 715 B1 | 7/1996 | H04B/1/66 |
| WO | WO 98/21834 | 5/1998 | H04B/1/713 |

\* cited by examiner

*Primary Examiner*—Mohammad H. Ghayour
(74) *Attorney, Agent, or Firm*—Sughrue Mion, PLLC

(57) ABSTRACT

Wireless telecommunications systems with at least one base station and with mobile user terminals are known where radio signals are transmitted and received in different time and frequency states. Both on user channels as well as on signaling channels there are radio signals that are transmitted corresponding to the predicted frequency hopping sequence. We now suggest, first, that the base station and the user terminal contain controllers (CTR) to control the frequency state alternation that produce no frequency hopping sequences for the first part of the time grid but rather predict a steady frequency (f0) and produce a pseudorandom frequency hopping sequence (THS) for at least one further part of the time grid after one iterative process (LGNR), second, that the base station transmits an input value (CW) to the user terminals in order to process the pseudorandom frequency hopping sequence, and to control the frequency alternation in accordance with this pseudorandom frequency hopping sequence in the controller for registering user terminals. This way we can achieve the result that a processed frequency hopping sequence is used as early as during transmission of registration signals, i.e. a frequency hopping sequence that is developed on the basis of the input value and does not have to be saved completely.

10 Claims, 4 Drawing Sheets

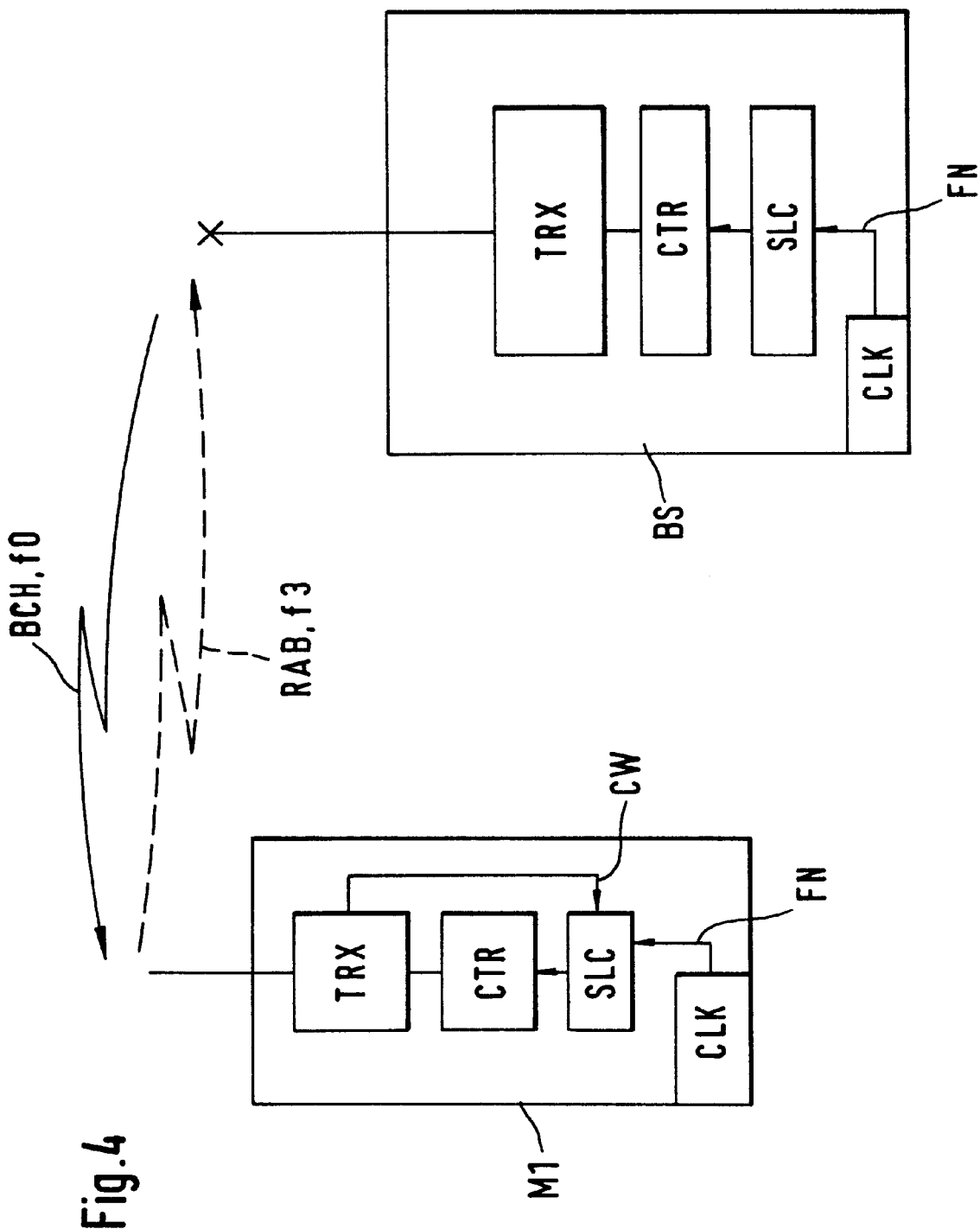

WIRELESS TELECOMMUNICATIONS SYSTEM, BASE STATION AND MOBILE USER TERMINAL THAT EXCHANGE RADIO SIGNALS ACCORDING TO A FREQUENCY HOPPING SEQUENCES

BACKGROUND OF THE INVENTION

The invention concerns a wireless telecommunications system with at least one base station and with mobile user terminals according to the global assertion under claim one. In addition to this, the invention is concerned with a base station as well as a mobile user terminal for such a wireless telecommunications system according to the global assertion of one of the coordinate claims.

A wireless telecommunications system with at least one base station and with mobile user terminals is known from U.S. Pat. No. 4,554,668. The system described there contains various base stations which each supply one radio cell, and which each exchange radio signals wit the user terminals found therein. The radio signals are sent and received in varying time slots and frequency slots. Thereby, a given frequency hopping is exchanged, in varying frequency slots, between the frequency slots. The user signals as well as the signaling signals are transferred in this manner, i.e. radio signals are exchanged on the user information channels as well as on the signaling channels within a time grid divided into time slots and in accordance with the given frequency hopping sequence. All of the user terminals described there use a different individual frequency hopping sequence assigned to it. These different individual frequency hopping sequences are produced by a process well known in itself, basically by the process named there in column 3, line 42 ff. for the creation of frequency hopping sequences according to D. V. Sarwattee and M. B. Pursely. This and other processes for the creation frequency hopping sequences are, in themselves, known under the term "frequency hopping algorithm" and serve to make a radio transfer of user signals resistant to interference.

A wireless telecommunications system is known from European patent (EP) 423 715 B1, by which a radio transfer is carried out on user information channels as well as on signaling channels according to a given frequency hopping. The telecommunications system described there contains many equal user terminals which exchange radio signals with each other directly.

A wireless telecommunications system is known from EP 467 600 B1, by which radio signals are exchanged between base stations and mobile user terminals within a time grid divided into time slots, and over a given frequency slot. The radio signals can be signaling signals. A radio transfer through the use of frequency hopping sequences is not described there.

SUMMARY OF THE INVENTION

The task of the invention is to improve the wireless telecommunications system mentioned at the outset, in that, first, the signaling channel is suited for the radio transfer of different signaling signals in order to be able to be used for various purposes, especially for initializing and registering and, second, in that an interference resistant radio transfer through the use of frequency hopping sequences is possible. In addition, a base system as well as a mobile user terminal for such a wireless telecommunications system should be proposed.

The task will be accomplished through a wireless telecommunications system in which the base station and the user terminals contain controllers for controlling the frequency slot alternations which produce no frequency hopping for the first portion of the time grid, but rather emit a steady frequency, and which, for at least a further portion of the time grid, produce a pseudorandom frequency hopping according to an iterative process by which the base station sends an input value to the user terminals, by which the controllers of the input value calculate the pseudorandom frequency hopping, and by which the controllers for the registering of the user terminals control the frequency change according to this pseudorandom frequency hopping.

In accordance with this the base station sends an input value to the user terminals after the frequency change for registering the user terminals is controlled, in order to calculate a pseudorandom frequency hopping from it. Thus it is accomplished that a frequency hopping, which is developed on the basis of the input value and does not need to be completely saved, is used already in the transfer of registration signals.

It is especially advantageous if, in the radio transfer on the signaling channel, two different processes for the creation of frequency hopping are used. Thus, a radio transfer of tow different signaling signals on one signaling channel is made possible. This can serve various purposes whereby different, respectively optimally suited, frequency hopping can be used.

It is especially advantageous if the base station and the user terminals with the controllers contain connected means of choosing which ascertain the current time slot and then choose, from the minimum two different processes, that process according to which the controllers control the frequency slot alternations. Thus it is ascertained in a simple manner on the basis of the current time slot, which of the different processes for the creation of frequency hopping sequences should be implemented.

It is also especially advantageous if, first, the base station and the user terminals contain data storage devices in which a predefined frequency hopping is saved which creates the first frequency hopping and, second if, in the initializing signals for the creation of a radio connection, the frequency change according to this predefined frequency hopping is used. Thus it is achieved that the base station as well as any user terminal already know, before the creation of a radio connection, the specific frequency hopping which is to be used in the transferring of initializing signals on the signaling channel. Thus, directly in the creation of the radio connection, the advantage of "frequency hopping" can be immediately exploited.

Further advantageous uses arise out of the coordinate claims.

BRIEF DESCRIPTION OF THE DRAWINGS

In the following the invention will be more precisely described on the basis of a usage example and with the assistance of the following figures:

FIG. 4 shows the block figures of a mobile user terminal and of a base station.

DETAILED DESCRIPTION OF THE INVENTION

Figure 1:
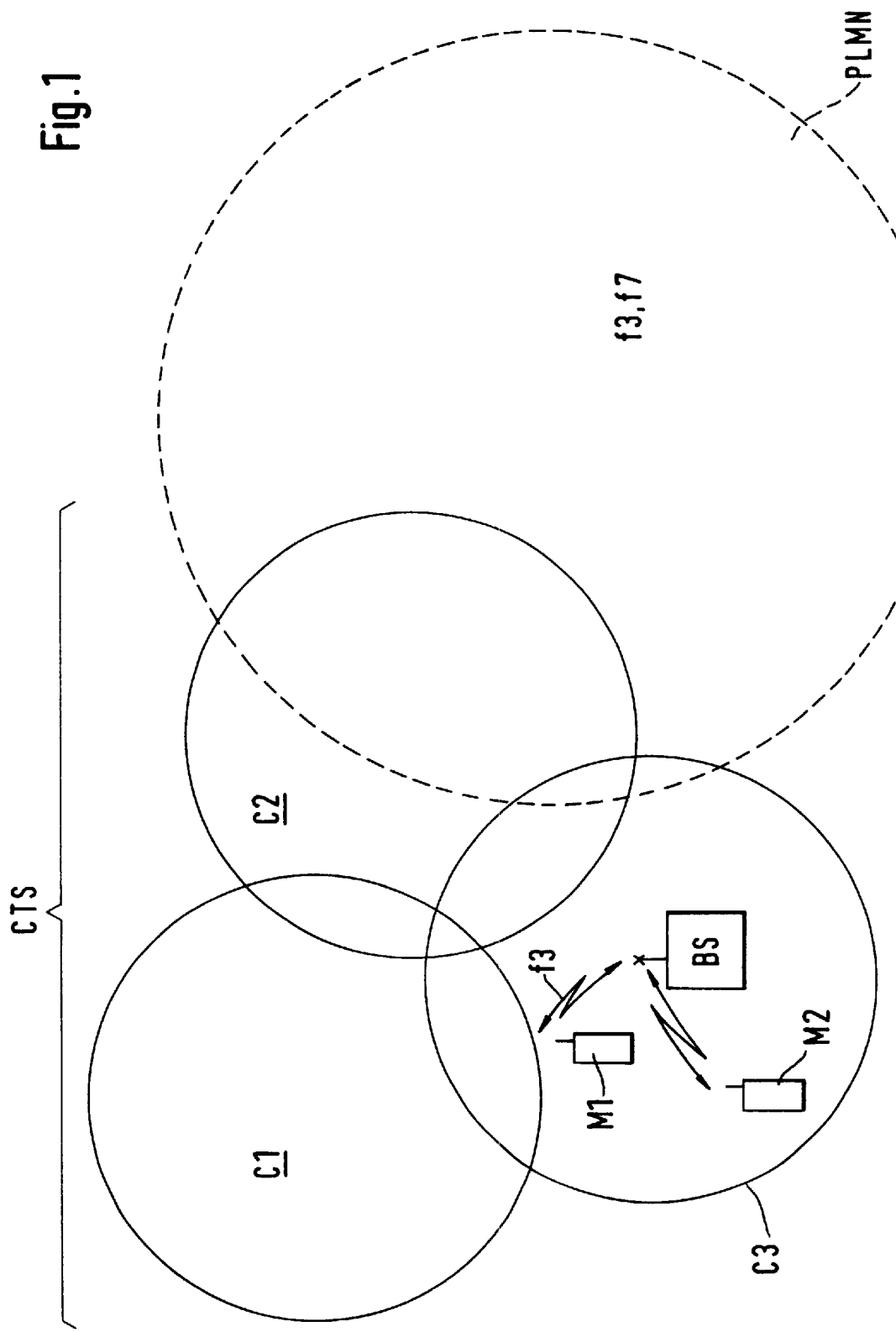
FIG. 1 shows schematically the construction of a wireless telecommunications system in accordance with the inventions.

FIG. 1 shows schematically the construction of a telecommunications system CTS with three base stations, from which only one base station is shown as an example. Every base station supplies a radio cell C1, C2 and C3, in which mobile user terminals are located. Only two user terminals, M1 and M2, which are located in the radio cell C3, are shown as examples. A portion of this radio cell C3 and a portion of the radio cell C2 overlap with the supply area of a public mobile radio net PLMN, in which the frequency slots f3 and f7 are used. These frequency slots are also used in the wireless telecommunications system CTS, so that it can come to interference. FIG. 1 shows that the mobile user terminal M1 currently is sending a signaling signal to the base station BS in the frequency slot f3. The other user terminal M2 receives a signaling signal from the base station BS in the frequency slot f5.

Figure 2:
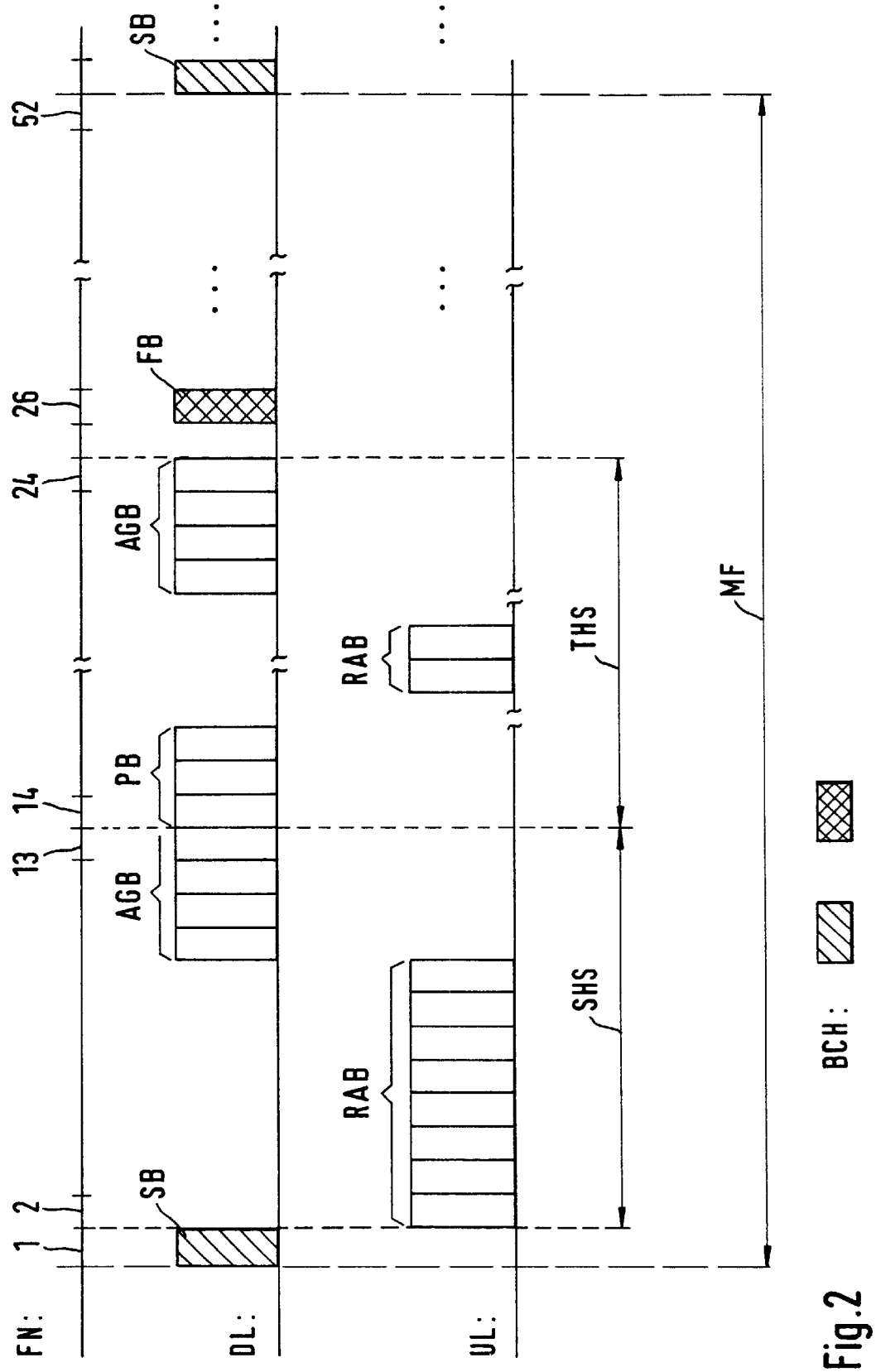
FIG. 2 shows the structure of a time grid on the basis of which the radio transfer will occur.

The transfer of radio signals on the signaling channel is more precisely described on the basis of FIG. 2 which reproduces the structure of a time grid. The time grid corresponds to a multiframe MF which encompasses 52 TDMA time-frames. Every time-frame, in turn, encompasses 8 TDMA time slots which assigns the base station the mobile user terminals. Every user terminal occupies a TDMA time slot, for example the user terminal M1 occupies the time slot 1 and the user terminal M2 occupies the time slot 2 (not depicted).

In order to emphasize the transfer of radio signals between the base station BS and the mobile user terminal M1, FIG. 2 shows the time sequence of the signaling signals transferred on the down-link channel DL as well as on the up channel UL within the multiframe MF. In this example, this deals with different signaling bursts SB, FB, AGB, PB, and RAB which serve the following purposes: The synchronizing bursts SB and the frequency correction bursts FB serve the agreement between sender and receiver; the access granting bursts AGB serve the assignment of a user information channel or controlling channel through the base station; the search call burst PB serves to establish a connection of a radio connection and the random access burst (RAB) serves to perform the inquiry at the base station after assigning a control channel.

The multiframe (MF) comprises 52 time frames with the numbers FN=1 to 52. In the time frames with the numbers FN=1 and FN=26, the synchronizing burst SB and/or the frequency correction burst FB are sent on the down-link channel DL on the steady frequency f0 by the base station to the user terminals. This way, the time frame numbers FN=1 and 26 form a radio voice signaling channel (see BCH in FIG. 4) on which information for synchronizing and frequency correction are sent to all user terminals. The radio voice signaling channel is a unidirectional channel in down-link direction on which the base stations send information with maximum efficiency so that all of the user terminals that are in the so-called "stand-by state" can receive the information. All user terminals of the telecommunications system are familiar with the frequency state f0 of the channel. If, however, individual user terminals—especially user terminals outside the system—are not familiar with the frequency state f0, then a scan is run for all frequency states (scanning).

In the other time frames FN=2–25 and FN=27–52, the other signaling signals are transmitted for the aforementioned initialization and registration. The corresponding initialization channels and registration channels are duplex channels. To transmit the different signaling signals within the multiframe MF, different frequency hopping processes are implemented by using an initial, predefined frequency hopping sequence SHS in one part and a second calculated frequency hopping sequence THSS in another. The multiframe MF illustrated in FIG. 2 extends from the time frame number FN=1 up to the time frame number FN=52 and is divided as follows: in one part, which extends from FN=2 to FN=13 and is used for initialization, and in another part, which extends from FN=14 to FN=24 and which is used for registration.

Within the one part using the initial, predefined frequency hopping sequence SHS, then 8 random access bursts RAB are transmitted on the up-link channel UL and finally four access granting bursts AGB are transmitted on the down-link channel DL. The random access bursts RAB are so-called "random access bursts" that the base station sends back to the user terminal for confirmation of initialization. This is how initialization is completed. The predefined initial frequency hopping sequence SHS in use is saved both on the base station as well as on the user terminal. Accordingly, transmission can be performed with "frequency hopping" during initialization in order to avoid as much interference with overlapping mobile radio networks as possible.

The one part, the initialization phase, is attached to by the other part, the registration phase, which begins with the time frame FN=14 and extends up to the time frame FN=24. Within this part, transmissions are performed in accordance with a calculated frequency hopping sequence THS where three paging bursts PB, so-called "paging bursts," and then three random access bursts RAB and finally four access granting bursts are transmitted on the downlink channel DL.

The paging bursts PB are sent by the base station BS to the telecommunications transmitter, which then returns the random access bursts RAB in order to be able to be registered at the base station BS. The registration is completed by four access granting bursts AGB that the base station sends to the user terminals. The frequency hopping sequence used during the registration phase is calculated both within the base station as well as within the user terminal after an iterative process, namely, the "total frequency hopping algorithm" typical for user channels by Lempel-Greenberger. Here, using a 16-bit code word, the base station transmits to the user terminal and this serves as a piece of input data for calculating the frequency hopping sequence. The algorithm of the calculated frequency hopping sequence links the 16-bit input data corresponding to the function of a feedback shift register and thereby produces a pseudorandom frequency hopping sequence. This way, a frequency hopping process that per se is normally implemented for transmitting user signals on traffic channels. is implemented during the registration phase. This way the advantages of "total frequency hopping" are given as early as during registration. After registration, the further establishment of the radio connection takes place, which is not the object of the invention under discussion here.

Figure 3A:
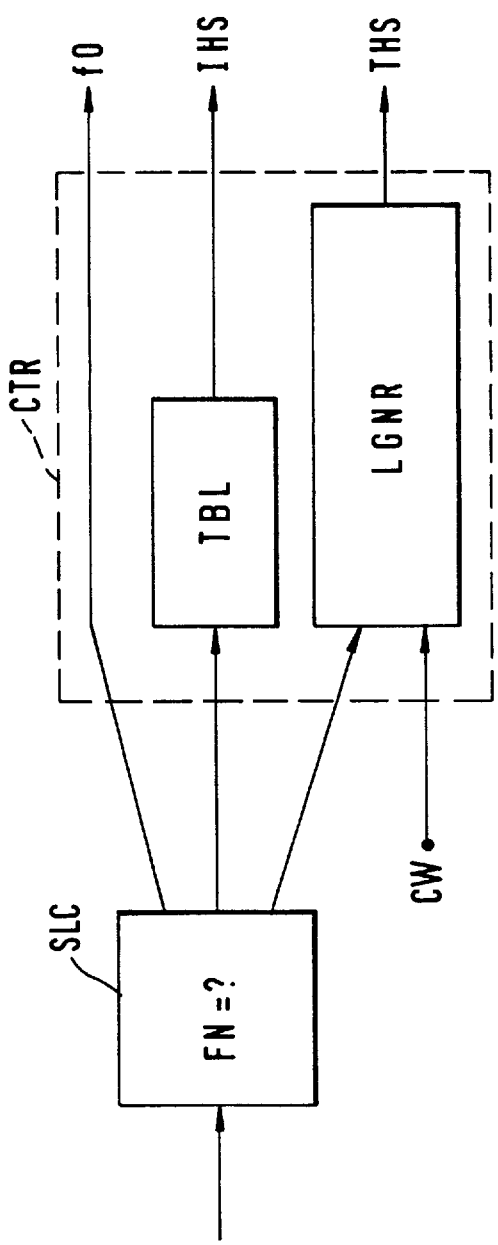
FIG. 3a portrays a block figure of the wiring of a selection device and a controller.
Figure 3B:
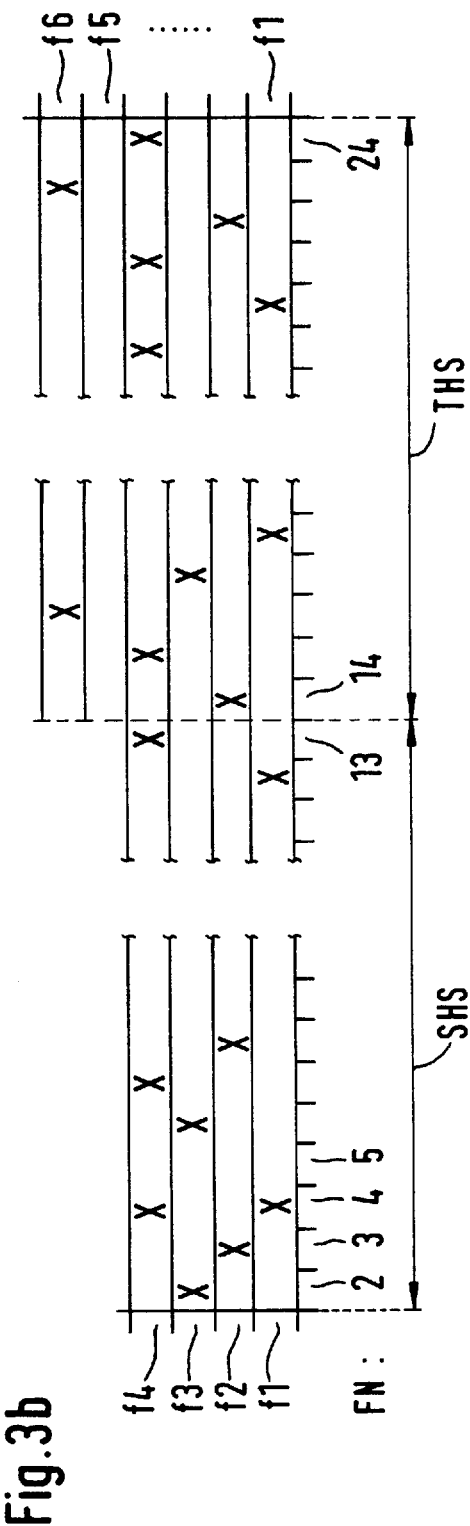
FIG. 3b shows schematically the time sequence of the frequency change within the first and second portions of the time grid.

Using FIGS. 3 and 4, the establishment and the function of a mobile user terminal and a base station will now be described in more detail:

FIG. 3 is divided into FIGS. 3a and 3b. In FIG. 3a, a bending of assembly parts is illustrated schematically that contain both the base station as well as the user terminals. These elements include a selection check SLC and a controller CTR connected to it. The selection check SLC tests the current time slot, i.e. those time frames with the number FN in which transmission and reception are current being performed. Because the base station and the user terminals are synchronized with each other, the current time slot can be provided simply by querying an internal timing switch CLK. The time is determined from the current time frame number FN and serves to determine which of the divisions of the multiframe MF previously described using FIG. 2 are currently valid.

The selection check SLC evaluates the frame number FN and selects one of the three options described below, according to which the controller CTR produces the frequency hopping sequence that is to be used at that point in time. These three different options are illustrated symbolically in FIG. 3a as follows:

One of the options is to produce no frequency hopping sequence per se but rather to predict only a steady frequency f0. This option is predicted for the transmission of the SB burst and FB bursts in the time slots FN=1 and/or FN=26 in order to transmit information to all user terminals on the previously mentioned radio speech signaling channel. As another option, the first process for producing the predefined frequency hopping sequence SHS is applied. This process is illustrated in FIG. 3a symbolically with a block TBL that is supposed to illustrate that the first process is a memory reading process where the values for the predefined frequency hopping sequence SHS are read out from a reference table, a so-called "look up table." As another option, the second process is applied for calculating pseudorandom frequency hopping sequences THS, which is illustrated schematically by a block LGNR. The calculation process for producing the pseudorandom frequency hopping sequence proceeds from one input value which the base station BS predicts in the form of the n-value code word CW (here n=16) and which corresponds to the input state of an n-level feedback shift register. As a process of calculation that represents the function of an n-level feedback shift register, a process is used here, for example, in accordance with Lempel-Greenberger.

In FIG. 3b, the layout of frequency states changing from time frame to time frame within the first and second parts of the multiframe MF is illustrated. In the first part, the first predefined frequency hopping sequence SHS is illustrated where there is alternation among four frequency states f1, f2, f3 and f4. The pattern of the frequency hopping sequence is stored in memory that the controller accesses. The second part shows a pseudorandom frequency hopping sequence THS where there is alternation among six frequency states f1 through f6. The pattern of this frequency hopping sequence is not saved securely in memory but is processed. Thus, in FIG. 3b the fact that fewer frequency states are provided for the first frequency hopping sequence SHS than for the second frequency hopping sequence THS is illustrated. This is supposed to show that it can make sense to provide fewer frequency states, thus a narrower expansion factor, for initialization in the first part than for registration in the second part.

FIG. 4 shows schematically the construction of a mobile user terminal M1 as well as the construction of a base station BS. The base station radios a signaling signal on the radio speech signaling channel BCH to the user terminal that is in the so-called "stand-by state," and in fact in the time slot FN=1 and in the steady frequency state f0. The initialization phase has thus not yet begun.

The user terminal M1 illustrated schematically in FIG. 4 contains a transmission receiver TRX, a controller CTR connected to it, a selection check SLC connected to it, and a timing switch CLK connected to it. The timing switch provides the current frame number, here FN=1, that the selection check evaluates in order to select the process to be used for control. At the connection to the current time slot FN=1, time slot FN=2 follows, i.e. the start of the initialization phase where transmission takes place in accordance with the first predefined frequency hopping sequence. The user terminal is thus ready to transmit a random access burst RAB in the next time frame FN=2 on the frequency state f3 to the base station BS and will read the first frequency hopping sequence from memory for initialization. Furthermore, the user terminal is informed about the code word CW by the evaluation of the receiver signals and can calculate the pseudorandom frequency hopping sequence for the registration that has to be executed later.

The base station contains a diplexer DIP, a receiver component connected to it, and a transmitter, which both constitute a transmitter-receiver TRX. Furthermore, the base station contains a controller CTL that is connected to the receiver component and the transmitter component as well as a selection check SLC that is connected with the control component. Furthermore, the base station contains a timing switch CLK that gives the frame number FN. In the example illustrated in FIG. 4, the radio transmission is found from FN=1 to FN=2 during transmission. This means that the transmitter is transmitting on the frequency state f0 and that the receiver is ready to receive on the frequency state f3.

In the description of the invention, a physical signaling channel is treated on which several logical signaling channels are mapped using the so-called "mapping" procedure. It is also possible to establish several physical signaling channels. In both cases, different frequency humping processes for the different phases of the signaling can be applied in accordance with the invention, in particular for initialization and for registration.

What is claimed is:

1. Wireless telecommunications system (CTS) with at least one base station (BS) and with mobile user terminals (M1, M2) that exchange radio signals with at least one base station (BS) over a signaling channel within a time grid (MF) divided into time slots (FN) and, accordingly, over a prestorable frequency hopping sequence in varying frequency slots, characterized in that the minimum of one base station (BS) and the user terminals (M1, M2) contain controlling devices (CTR) for controlling the frequency slot alternations that produce no frequency hopping sequence for an initial portion of the time grid (MF), but rather emit a steady frequency (f0) and that produce, for at least one further part of the time grid (MF), a pseudorandom frequency hopping sequence (THS) according to an iterative process, and the base station (BS) sends an input value (CW) to the user terminals (M1, M2), and the controlling device (CTR) (M1, M2) computes the input pseudorandom frequency hopping sequence (THS) by means of the input value (CW) and the controlling device (CTR) controls the frequency change in accordance with this pseudorandom frequency hopping sequence (THS) for registering the user terminals (M1, M2).

2. Wireless telecommunications system (CTS) according to claim 1, characterized in that the iterative process (LGNR) for the creation of the pseudorandom frequency hopping sequence (THS) represents the function of an n-level shift register (n is a natural number), and in that the base station (BS) emits the input value in the form of an n-value code word (CW) which corresponds to the input condition of the shift register and serves as a piece of input data for the calculation of the frequency hopping sequence (THS).

3. Wireless telecommunications system (CTS) according to claim 2, marked by the fact that a process according to Lempel-Greenberger is used in the creation of the pseudorandom frequency hopping sequence (THS).

4. Wireless telecommunications system (CTS) according to claim 1, marked by the fact that the steady frequency (f0) is the frequency slot for a radio announcement signaling channel, on which the information (SB, FB) from the base station (BS) is sent to all user terminals (M1, M2) for synchronization and frequency correction.

5. Wireless telecommunications system (CTS) according to claim 1, marked by the fact that the base station (BS) and the user terminals (M1, M2) contain selection checks (SLC) connected to the controllers (CTR). These continually ascertain the current time slot (FN=2) in order to determine the beginning of any of the parts of the time grid (MF) and which then chooses from at least two different processes (TBL; LGNR) that one (TBL) with which to create a frequency hopping sequence (SHS) to be used at that moment.

6. Wireless telecommunications system (CTS) according to claim 1, characterized in that the base station (BS) and the user terminals (M1, M2) contain data storage devices in which a predefined frequency hopping sequence (SHS) is saved; the controlling devices (CTR) read this predefined frequency hopping sequence (SHS) from the data storage devices according to a process for reading stored data (TBL); and the controlling devices (CTR) controls the frequency change according to this predefined frequency hopping sequence (SHS) for the transfer of initializing signals for the establishment of a radio connection.

7. Wireless telecommunications system (CTS) according to claim 1, characterized in that the time grid is a TDMA-multiframe (MF) created from various time frames; every time frame contains many time slots which assign the user terminals (M1, M2) to the base station (BS), whereby every user terminal (M1) sends and receives within individual time slots which are determined by the number of the assigned time slots and by the number (FN) of the time frame.

8. Wireless telecommunications system (CTS) according to claim 1, characterized in that the minimum one base station (BS) sends a synchronization signal on a predetermined time slot (FN=1, 26) and through a predetermined frequency slot (f0) determined signalizing channel; and the mobile user terminals (M1, M2) receive the synchronization signal and synchronize themselves on this.

9. Base station (BS) which, in wireless telecommunications (CTS) with mobile user terminals (M1, M2), exchanges radio signals over a signaling channel within a time grid (MF), divided into time slots (FN) and does so in varying frequency slots (f1, f2, . . . , f6) according to a predeterminable frequency hopping sequence, characterized by controlling devices (CTR) for controlling the frequency slot alternations that produce no frequency hopping for the first part of the time grid (MF), but rather emit a steady frequency (f0) and which, for at least a further portion of the time grid (MF) produce a pseudorandom frequency hopping sequence (THS) according to an iterative process (LGNR); and by a transmitting receiver (TRX), connected with the controlling devices (CTR), which sends an input value (CW) to the user terminals (M1, M2) which contain controlling devices (CTR) which calculate the pseudorandom frequency hopping sequence (THS) by means of the input value (CW) and which controls the frequency change for the registering of the user terminals (M1, M2) according to this pseudorandom frequency hopping sequence (THS).

10. Mobile user terminal (M1) which, in a wireless telecommunications system (CTS) with a base station (BS), exchanges radio signals in varying frequency slots (f1, f2, . . . , f6) on a signaling channel within a time grid (MF) divided into time slots (FN) and, in accordance with an emitable frequency hopping, characterized by controllers (CTR) for controlling the frequency slot alternations which produce no frequency hopping for the first part of the time grid (MF), but rather emit a steady frequency (f0) and which, for at least a further portion of the time grid (MF) produce a pseudorandom frequency hopping sequence (THS) according to an iterative process (LGNR); and by a transmitting receiver (TRX), connected with the controlling devices (CTR), which receives an input value (CW) from the base station (BS) by means of which (CW) the controlling devices (CTR) calculate the pseudorandom frequency hopping sequence (THS) for controlling the frequency change according to this pseudorandom frequency hopping sequence (THS), in order to register the user terminals (M1, M2).

* * * * *